United States Patent
Banyas et al.

[11] Patent Number: 6,031,353
[45] Date of Patent: Feb. 29, 2000

[54] METHOD AND APPARATUS FOR COMMUNICATING BATTERY PACK INFORMATION

[75] Inventors: Timothy J. Banyas, Apex; Ivan N. Wakefield, Cary, both of N.C.

[73] Assignee: Ericsson, Inc., Research Triangle Park, N.C.

[21] Appl. No.: 09/030,118

[22] Filed: Feb. 25, 1998

[51] Int. Cl.[7] .................................................. H02J 7/00
[52] U.S. Cl. .......................................... 320/112; 320/107
[58] Field of Search .................................... 320/106, 107, 320/112, 157, 145; 429/96–100

[56] References Cited

U.S. PATENT DOCUMENTS

| | | | |
|---|---|---|---|
| 4,628,243 | 12/1986 | Hodgman et al. | 320/106 |
| 5,164,652 | 11/1992 | Johnson et al. | 320/106 |
| 5,227,712 | 7/1993 | Boman | 320/141 |
| 5,237,257 | 8/1993 | Johnson et al. | 320/106 |
| 5,485,090 | 1/1996 | Stephens | 320/106 |
| 5,538,007 | 7/1996 | Gorman | 600/523 |
| 5,541,490 | 7/1996 | Sengupta et al. | 320/160 |
| 5,561,361 | 10/1996 | Sengupta et al. | 320/152 |
| 5,606,241 | 2/1997 | Patino et al. | 320/137 |
| 5,656,917 | 8/1997 | Theobald | 320/106 |
| 5,680,031 | 10/1997 | Pavlovic et al. | 320/145 |
| 5,717,307 | 2/1998 | Barkat et al. | 320/106 |

FOREIGN PATENT DOCUMENTS 0 684 680 A1  11/1995  European Pat. Off. .

*Primary Examiner*—Peter S. Wong
*Assistant Examiner*—Lawrence Luk
*Attorney, Agent, or Firm*—Coats & Bennett, P.L.L.C.

[57] ABSTRACT

Information about a battery pack, such as the battery pack type of the battery pack, is communicated to a recharging device, preferably a wireless communications device such as a cellular telephone, via an information signal generated by the battery pack so that the recharging device may automatically distinguish between a plurality of different battery pack types to identify the type of an attached battery pack. The identification signal may be a repeating type having a fixed frequency between a low voltage level and a high voltage level and a dwell time at the high value. The identification signal is communicated to the recharging device and averaged over time. The averaged identification signal is compared against a reference signal, such as the voltage level of the battery, to determine a ratio therebetween. A logic circuit portion of the recharging device, such as a microprocessor, then identifies the battery pack type of the battery pack based on this ratio by comparing the ratio to one or more predetermined values where each of the predetermined values is associated with a battery pack type. Based on the battery pack type identified, the recharging device adjusts its charging profile or otherwise optimizes its operational characteristics. Further, the identification may instead be based on some characteristic of the identification signal itself, such as duty cycle or time at a particular voltage level. In addition, the identification signal may be continuously generated or may be generated periodically, or for some short period of time following certain events such a power-up or battery pack changeover. In some embodiments, the identification signal may contain additional or alternative information concerning the battery pack such as an indication of the number of recharge cycles the battery pack has been through.

42 Claims, 4 Drawing Sheets

METHOD AND APPARATUS FOR COMMUNICATING BATTERY PACK INFORMATION

FIELD OF THE INVENTION

The present invention relates generally to accessories for wireless communications devices, and more particularly to a method and apparatus for identifying battery pack types in wireless communications devices.

BACKGROUND OF THE INVENTION

Wireless communications devices, such as cellular telephones, may have a wide variety of accessories. Examples of accessories include battery packs, hands-free operation adapters, plug-in memory cartridges, and so forth. These various accessories, when connected to the wireless communications device, expand the device's capabilities.

When using the accessories, there is a great need to identify which type of accessory is being used so that operation may be optimized. For instance, the variety of rechargeable batteries for portable wireless communications devices have increased over time and continues to grow. Numerous different battery cell chemistries have been employed such as Lithium, Nickel Cadmium (NiCd), Nickel Metal Hydride (NiMH), and Alkaline. These battery cells are typically assembled into battery packs having various numbers of cells and overall capacities. Different battery pack types typically have different charge capacities and optimum charging profiles. Attempting to recharge a battery pack using a different profile may not only diminish battery life and efficiency, but may also create a hazard due to overcharging and overheating. As such, it is desirable for a battery charger, internal or external to a wireless communications device, to know which type of battery pack is being recharged.

Further, different battery packs exhibit different end of life voltage and other operational characteristics. As such, knowledge of the type of battery pack may be useful to wireless communications devices in regulating operational parameters such as transmitter output power or in warning the user of a "low battery" condition.

Thus, there remains a need for an inexpensive apparatus and method to automatically determine the type or class of battery pack so that charging or operational characteristics may be optimized. Preferably, the battery charger automatically recognizes the battery pack type being charged and adapts its charging and/or operational parameters accordingly.

SUMMARY OF THE INVENTION

The present invention provides a method and apparatus for automatically communicating information about a battery pack to a recharging device. Typically, such information is the battery pack type of the battery pack. Thus, by using the present invention, a recharging device may distinguish between a plurality of different battery pack types to identify the type of an attached battery pack.

In one preferred embodiment, an identification signal is generated by a battery identification circuit internal to the battery pack. This identification signal is a repeating type having a fixed frequency between a low voltage level and a high voltage level and a dwell time at the high value. Further, the battery pack generates a reference signal which is preferably the voltage level of the battery.

The identification signal is communicated to the recharging device and averaged over time. The averaged identification signal is compared against the reference signal to determine a ratio therebetween. A logic circuit portion of the recharging device, such as a microprocessor, then identifies the battery pack type of the battery pack based on this ratio by comparing the ratio to one or more predetermined values where each of the predetermined values is associated with a battery pack type. Based on the battery pack type identified, the recharging device adjusts its charging profile or otherwise optimizes its operational characteristics. Preferably, the recharging device is a wireless communications device, such as a cellular telephone. In alternative embodiments, the frequency may not be fixed across battery pack types. Further, the identification may not be based on a ratio, but instead on some characteristic of the identification signal itself, such as duty cycle or time at a particular voltage level. In addition, the identification signal may be continuously generated or may be generated periodically, or for some short period of time following certain events such a power-up or battery pack changeover. In some embodiments, the identification signal may contain additional or alternative information concerning the battery pack such as an indication of the number of recharge cycles the battery pack has been through.

DETAILED DESCRIPTION

The present invention utilizes an identification circuit 110 associated with a battery pack 100 to generate an identification signal indicative of the battery pack type. This identification signal is communicated to a wireless communications device 10 which, in a preferred embodiment, identifies the battery pack 100 type based on a ratio of the identification signal to a reference signal. Based on the battery pack 100 identified, the wireless communications device 10 adjusts the parameters of an included battery charging circuit 18 for optimum charging of that type battery pack 100.

Figure 1:
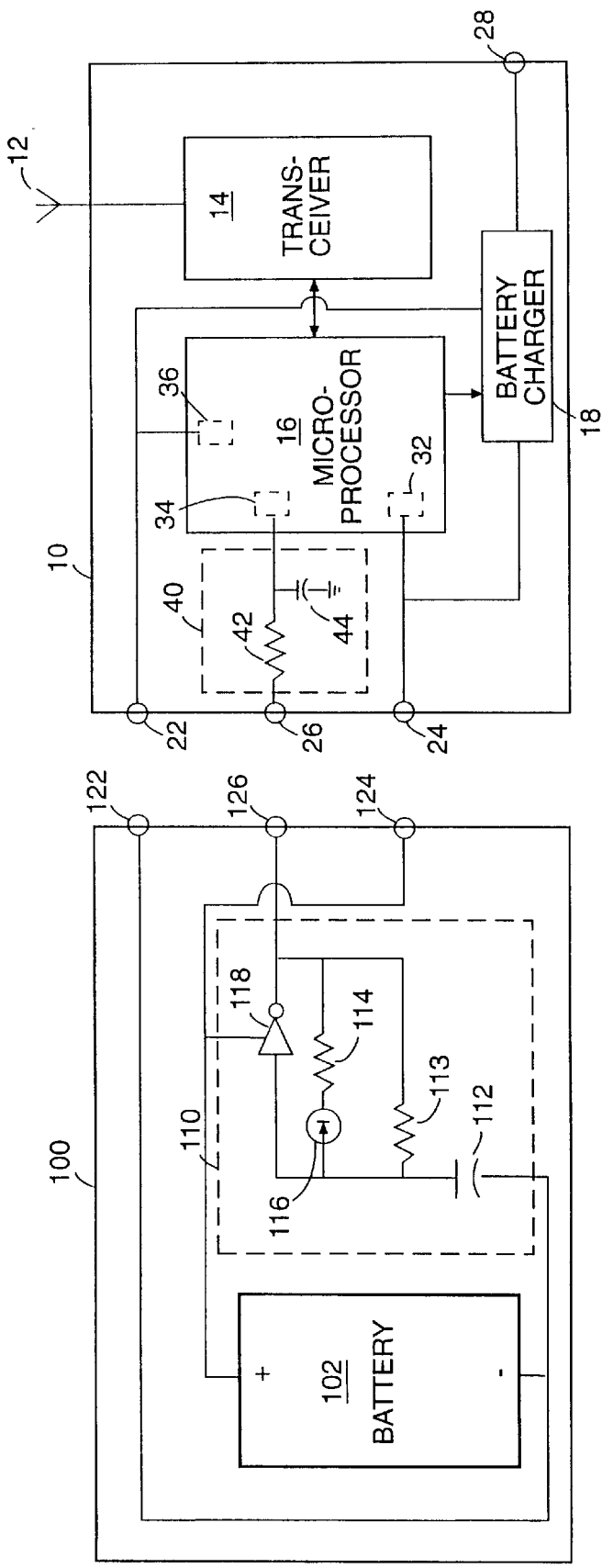
FIG. 1 is a simplified functional block diagram of a battery pack and a wireless communications device of the present invention.

A wireless communications device 10, such as a cellular telephone, is shown in FIG. 1. The wireless communications device 10 typically includes an antenna 12 coupled to a transceiver 14, a microprocessor 16, a battery charging circuit 18, and electrical terminals 22,24,26 for connection to the battery pack 100. The microprocessor 16 controls the overall function of the wireless communications device 10. The transceiver 14 encodes and decodes communication and control signals which are transmitted and received via the antenna 12. The battery charging circuit 18 converts power received from an external power source at an external power terminal 28 to a form suitable for recharging a battery pack 100. The battery charging circuit 18 operates under the control of the microprocessor 16. When the wireless communications device 10 is not coupled to external power, the wireless communications device 10 receives power from the battery pack 100 via a plurality of terminals 22,24. Further details of the wireless communications device 10 arrangement and functioning are well known in the art and are not important to understanding the present invention.

In one particular embodiment, the microprocessor 16 includes at least two analog to digital (A/D) ports 32,34 and a ground port 36. The ground port 36 is connected to a ground terminal 22. The first A/D port 32, called the reference power port, is connected to a positive power terminal 24. The second A/D port 34, called the ID signal port, is connected to an identification terminal 26 via a RC filter circuit 40. The RC filter circuit 40 includes a resistor 42 and a capacitor 44 connected as shown in FIG. 1.

The battery pack 100 includes a battery 102, a battery identification circuit 110, and a plurality of terminals 122, 124,126. The battery 102 may be composed of one or more battery cells connected in a manner well known in the art. The negative or ground portion of the battery 102 is connected to a ground terminal 122. The positive portion of the battery 102 is connected to a battery identification circuit 110 and to the positive power terminal 124. The battery identification circuit 110 is connected to both the positive portion of the battery 102 and the negative portion of the battery 102 and to the identification terminal 126.

Figure 2:
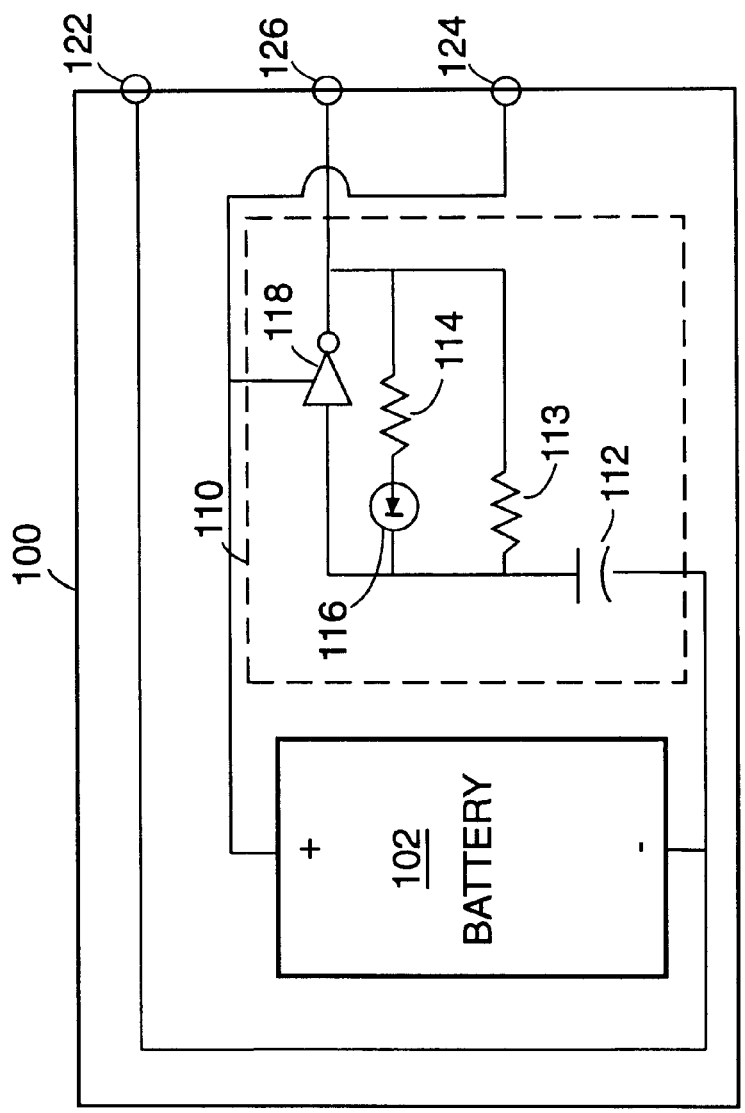
FIG. 2 is a simplified functional block diagram of an alternative battery pack configuration.

The battery identification circuit 110 includes a capacitor 112, a plurality of resistors 113,114, a diode 116, and an inverter 118 (preferably of a low current consumption type such as a Schmitt inverter) connected as shown in FIG. 1. The battery identification circuit shown in FIG. 1 functions for duty cycles above 50%. One alternative arrangement of the battery identification circuit 110 for duty cycles below 50% is shown in FIG. 2, wherein the sense of diode 116 is reversed with respect to that shown in FIG. 1.

When the battery pack 100 is coupled to the wireless communications device 10, the terminals 22,122,24,124,26, 126 make electrical contact. That is, ground terminal 22 is electrically connected to ground terminal 122, positive power terminal 24 is electrically connected to positive power terminal 124, and identification terminal 26 is electrically connected to identification terminal 126. In battery power mode, main power to the wireless communications device 10 is provided via ground terminals 22,122 and positive power terminals 24,124 in a manner well known in the art.

Figure 3:
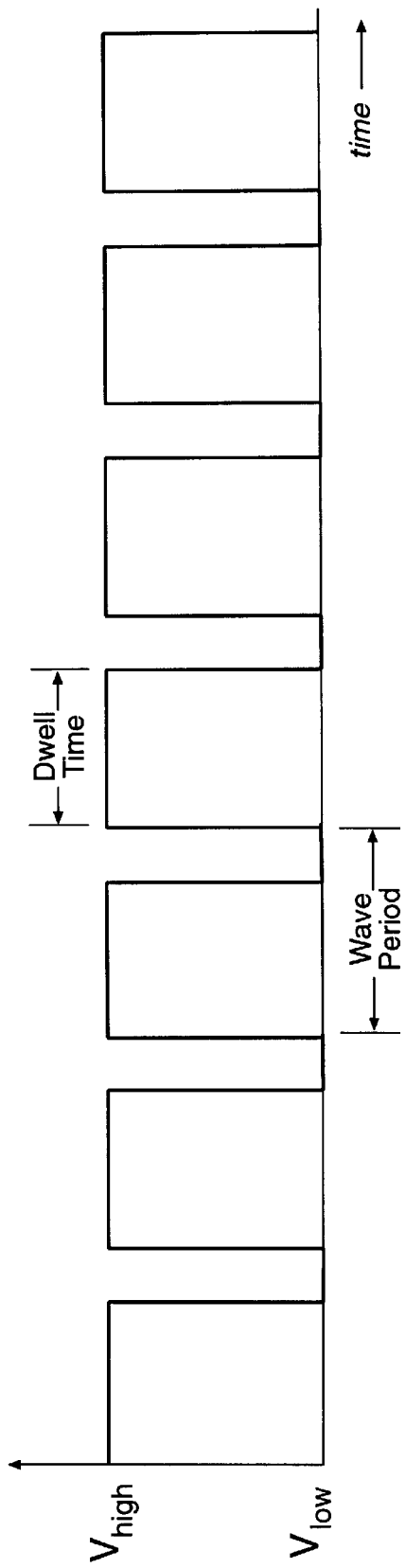
FIG. 3 is a first example of an identification signal of the present invention having a squarewave waveform.
Figure 4:
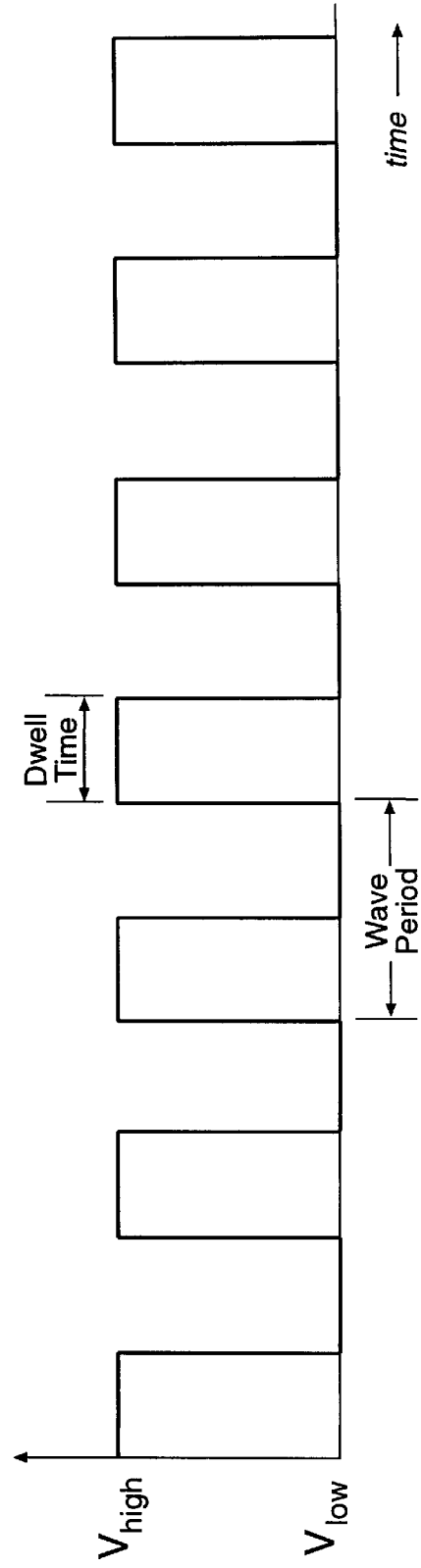
FIG. 4 is a second example of an identification signal of the present invention having a squarewave waveform.

In addition, the battery identification circuit 110 generates an identification signal which is communicated to the wireless communications device 10 via the identification terminals 26,126. In a first embodiment, this generated identification signal varies over time at a fixed frequency, but has a variable duty cycle. An example of two possible identification signals are the squarewave waveforms shown in FIG. 3 and FIG. 4. As shown in the figures, the time from the start of one wave to the start of the next is constant, thereby defining a fixed frequency. The two identification signals of FIG. 3 and FIG. 4 are differentiated by their duty cycles, that is the time spent at the high voltage. The identification signal of FIG. 3 has a dwell time at the high voltage level of ¾ of the period of the wave, thus its duty cycle is ¾(75%). The identification signal of FIG. 4 has a dwell time at the high voltage level of ½ the period of the wave, thus its duty cycle is ½ (50%). While two examples of the identification signal are shown in FIGS. 3 and 4, a wide variety of duty cycles are possible. The number of different duty cycles may be limited by the frequency employed and the resolution of the generation and detection electronics, including slew rates.

When power is applied to the battery identification circuit 110 of FIG. 1, the energy stored in capacitor 112 is zero. Therefore, the voltage applied to the inverter 118 will be ground; consequently, the inverter 118 outputs a high voltage level. This high voltage level begins to charge up capacitor 1 12 through resistor 113. Eventually, the capacitor 112 will charge up, causing the input voltage to the inverter 118 to exceed logical high. When this happens, the inverter 118 will output a low voltage level, which in turn causes capacitor 112 to discharge through resistors 113 and 114. As capacitor 112 discharges, the voltage level to the inverter 118 will decrease. When the voltage to the inverter 1 18 falls below the logical low level, the inverter 1 18 will output a high voltage level. This cycle will repeat itself indefinitely for the battery identification circuit 110 of FIG. 1.

The particular identification signal generated by the battery identification circuit 110 will depend on the characteristics of the components of the battery identification circuit 110. By controlling the charge and discharge times of the capacitor 112, through the selection of the combination of capacitor 112, resistor 113 and resistor 114, the duty cycle and frequency of the generated identification signal may be controlled. Examples of various combinations are given below:

| Capacitor 112 | Resistor 113 | Resistor 114 | Frequency | Duty Cycle |
|---|---|---|---|---|
| 10 nf | 34 kΩ | 9.8 kΩ | 5 kHz | 80% |
| 10 nf | 25 kΩ | 38 kΩ | 5 kHz | 60% |
| 10 nf | 22.7 kΩ | 60.4 kΩ | 5 kHz | 40% |
| 10 nf | 30 kΩ | 11.3 kΩ | 5 kHz | 20% |

The battery identification circuits 110 shown in FIG. 1 and FIG. 2 are examples of circuits suitable for generating the battery identification signal. However, any circuit which outputs a constant frequency wave with varying duty cycles would function equivalently and is encompassed herein. Preferably, the waveform generated has a squarewave waveform. It is preferred that the battery identification circuit 110 consume very little power, such as less than 10 pA.

The difference in duty cycles allows the wireless communications device 10 to determine which type of battery pack 100 it is coupled to. The battery identification signal is received at the identification terminal 26 and filtered by the RC filter circuit 40. The RC filter circuit 40 smoothes the identification signal to produce a steady voltage level signal with the voltage level being the average of the identification signal generated by the battery identification circuit 110. This voltage level is communicated to the ID signal port 34 on the microprocessor 16. In addition, the battery voltage level is communicated to the reference power port 32 via the positive power terminals 24, 124. The microprocessor 16 then compares the voltage levels at the ID signal port 34 and the reference power port 32 and determines the relative ratio therebetween. Based on this ratio, the microprocessor 16 consults a lookup table of battery pack types and their corresponding duty cycles to determine what type of battery pack 100 is coupled to the wireless communications device 10.

Once the battery pack type is determined, the wireless communications device 10 may make any adjustments required to the battery charging circuit 18 for optimum battery charging and/or may change other operational characteristics such as transmit power level.

Note that the term "battery pack type" as used herein means the combination of battery cell chemistry/composition and the number and size of such cells in a battery pack 100. For instance, one battery pack type could be four size A lithium battery cells, another battery pack type could be six size A lithium battery cells, and still another battery pack type could be one size C NiCd battery cell.

The term "recharging device" includes stand alone battery pack rechargers which draw power from external power sources, such as a wall outlet, and wireless communications devices which include battery recharging circuits 18. Note that stand alone battery rechargers may also perform other functions such as facilitating hands-free operation of wireless communications devices.

The discussion above has assumed that the battery pack 100 is coupled to a wireless communications device 10, which in turn includes the RC filter circuit 40, battery charging circuit 18, and microprocessor 16. However, the present invention also functions when the RC filter circuit 40, battery charging circuit 18, and microprocessor 16 are part of a stand-alone battery charger. These components function in the same manner as described above and the battery identification signal is handled as described above. Based on the ratio of the identification signal to the reference battery signal, the battery charger identifies the battery pack type and adjusts charging parameters accordingly.

The discussion above has used a microprocessor 16 as an example of a logic circuit that performs the comparison of voltage levels and the identification of the battery pack type via the lookup table. However, a microprocessor 16 need not be employed. Instead, dedicated discrete logic circuits may be used or other circuits within the wireless communications device may be used to perform equivalent functions.

In the discussion above, the battery identification signal has a fixed frequency across battery pack types and the battery identification signal is compared against a reference signal on a voltage ratio basis. However, the present invention does not require that the battery identification signal have a fixed frequency across battery pack types. The comparison against a reference signal on a voltage basis will work equally well at a plurality of frequencies, provided that the ratio of the battery identification signal average voltage to the reference signal voltage remains indicative of the battery pack type.

Furthermore, alternative embodiments of the present invention do not require a reference signal. Instead, the characteristics of the battery identification signal itself are examined to identify the battery pack type. For instance, the RC filter circuit 40 may be omitted and the battery identification signal may be directly routed to the microprocessor 16. See FIG. 5. The microprocessor 16 may digitally sample the battery identification signal and monitor the ratio of high voltage level to low voltage level of the battery identification signal, thereby monitoring the duty cycle of the battery identification signal. The digital sampling rate should be at a frequency significantly higher than the frequency of the battery identification signal. Based on the duty cycle of the battery identification signal, the battery pack type is identified as described above. Alternatively, the absolute time that the battery identification signal is at a certain logical voltage level, such a logical high, may be monitored by the microprocessor 16 and different times may be used to identify different battery pack types.

Figure 5:
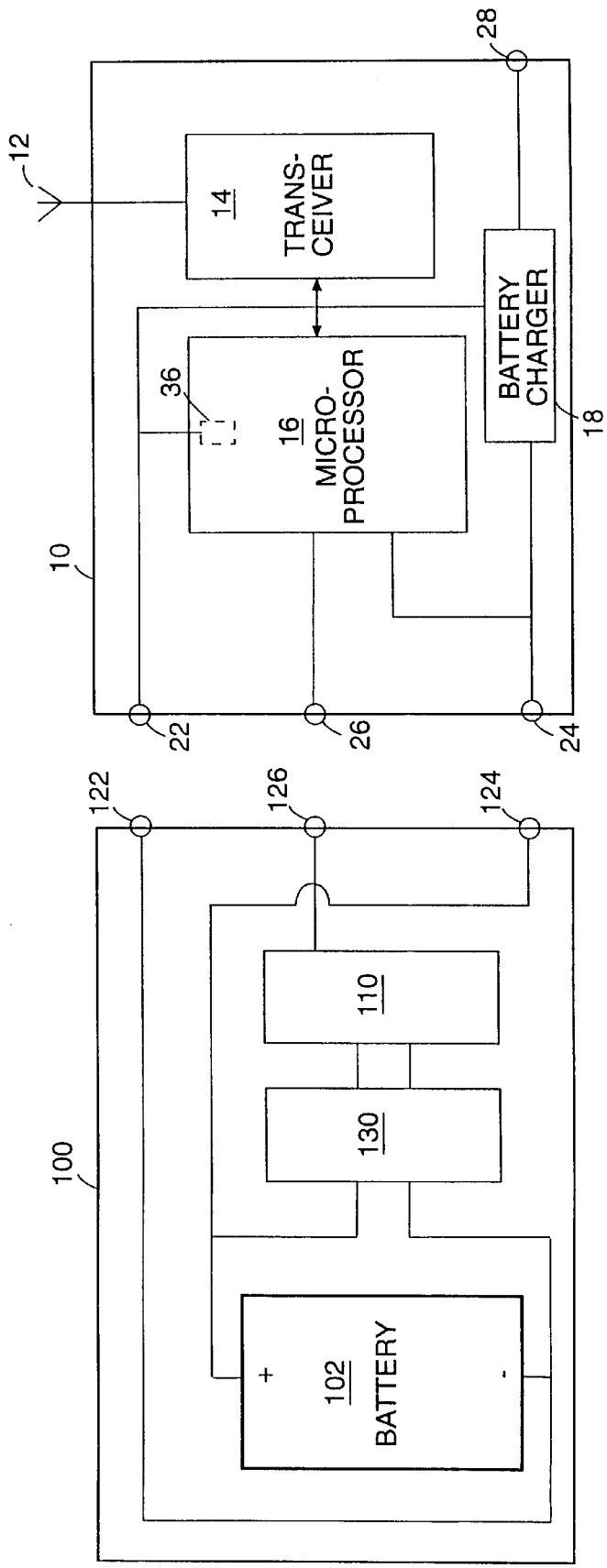
FIG. 5 is a simplified functional block diagram of a battery pack of the present invention which includes a logic circuit between the battery and the battery identification circuit and a wireless communications device of the present invention without a filtering circuit.

An alternative arrangement of the battery pack 100, which includes an additional logic circuit 130, is shown in FIG. 5. The logic circuit 130 controls the operation of the battery identification circuit 110. The logic circuit 130 may, for example, control the battery identification circuit 110 such that the battery identification signal is not generated continuously. For instance, the battery identification signal may be generated periodically, or for some short period of time following certain events such a power-up or battery pack 100 changeover. In addition, the logic circuit 130 may cause the battery identification signal to be indicative of some characteristic of the battery pack other than simply battery pack type. For instance, the battery identification signal may be used to indicate the number of recharge cycles the battery pack 100 has been through, battery temperature, remaining capacity, a low voltage condition, or the like.

The present invention encompasses any wireless communications device 10 which is powered by any one of multiple different types of battery packs 100. Examples include cellular telephones, personal communications assistants, pagers, and the like. Also, as mentioned above, a stand alone battery charger may take the place of the wireless communications device 10.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

We claim:

1. A method for communicating information about a battery pack for a wireless communications device, comprising:

a) generating, at said battery pack, a repeating information signal having a frequency between a low value and a high value and a dwell time at said high value; and b) determining one or more characteristics of said battery pack based on said information signal.

2. The method of claim 1 wherein said characteristic is the battery pack type of said battery pack.

3. The method of claim 1 wherein said generating of said repeating information signal is for a predetermined time interval and then stops.

4. The method of claim 3 wherein said predetermined time interval is 10 seconds.

5. The method of claim 1 wherein said determining is based on the duty cycle of said information signal.

6. The method of claim 1 wherein said determining is based on said dwell time at said high value.

7. The method of claim 1 further including generating, at said battery pack, a reference signal and wherein said determining is based on the ratio of said information signal to said reference signal.

8. The method of claim 7 wherein said battery pack belongs to one of a plurality of battery pack types and wherein said frequency is the same for a plurality of said battery pack types.

9. A method for distinguishing between a plurality of different battery pack types to identify the type of a battery pack, comprising:

a) generating, at said battery pack, a repeating identification signal having a frequency between a low value and a high value and a dwell time at said high value; and b) identifying the battery pack type of said battery pack based on said identification signal.

10. The method of claim 9 wherein said generating of said repeating identification signal is for a predetermined time interval and then stops.

11. The method of claim 10 wherein said predetermined time interval is 15 seconds.

12. The method of claim 9 wherein said identifying is based on the duty cycle of said identification signal.

13. The method of claim 9 wherein said identifying is based on said dwell time at said high value.

14. The method of claim 9 further including generating, at said battery pack, a reference signal and wherein said determining is based on the ratio of said identification signal to said reference signal.

15. A method for distinguishing between a plurality of different battery pack types to identify the type of battery pack, comprising:
   a) generating, at said battery pack, a repeating identification signal having a frequency between a low value and a high value and a dwell time at said high value;
   b) generating a reference signal;
   c) determining the ratio of said identification signal to said reference signal; and
   d) identifying the battery pack type of said battery pack based on said ratio by comparing said ratio to one or more predetermined values; each of said predetermined values being associated with a different one of said plurality of different battery pack types.

16. The method of claim 15 wherein said low value and said high value are different voltage levels.

17. The method of claim 16 wherein said ratio is the based on the average voltage value of said identification signal.

18. The method of claim 15 wherein said reference signal is the present voltage level of said battery pack.

19. The method of claim 15 wherein a wireless communications device performs said comparing and said identifying.

20. A method for a recharging device to distinguish between a plurality of different battery pack types to identify the type of battery pack, comprising:
   a) generating, at said battery pack, a repeating identification signal having a fixed frequency between a low voltage level and a high voltage level and a dwell time at said high voltage level;
   b) generating, at said battery pack, a reference signal representing a present voltage level of said battery;
   c) averaging said identification signal;
   d) comparing, by a recharging device, said averaged identification signal to said reference signal to determine the ratio of said averaged identification signal to said reference signal; and
   e) identifying, by said recharging device, the battery pack type of said battery pack based on said ratio by comparing said ratio to one or more predetermined values; each of said predetermined values being associated with a battery pack type.

21. The method of claim 20 wherein said recharging device is a wireless communications device.

22. The method of claim 21 wherein said wireless communications device is a cellular telephone.

23. The method of claim 20 wherein said recharging device is a stand alone battery pack recharger.

24. The method of claim 20 wherein said generation of said identification signal is by a circuit having at least a diode, an inverter, a capacitor, and a plurality of resistors.

25. A device for communicating information about a battery pack for a wireless communications device, comprising:
   a) a battery identification circuit; said battery identification circuit generating a repeating information signal at said battery pack having a frequency between a low value and a high value and a dwell time at said high value; and
   b) a logic circuit external to said battery pack; said logic circuit monitoring said information signal and determining one or more characteristics of said battery pack based on said information signal.

26. The device of claim 25 wherein said battery pack belongs to one of a plurality of battery pack types and wherein said characteristic is the battery pack type of said battery pack.

27. A battery pack type identifier for distinguishing between a plurality of different battery pack types to identify the type of a battery pack, comprising:
   a) a battery identification circuit; said battery identification circuit generating a repeating identification signal at said battery pack having a frequency between a low value and a high value and a dwell time at said high value; and
   b) a logic circuit external to said battery pack; said logic circuit monitoring said identification signal and identifying the battery pack type of said battery pack based on said identification signal.

28. The battery pack identifier of claim 27 wherein said logic circuit monitors the duty cycle of said identification signal and identifies the battery pack type of said battery pack based on said duty cycle.

29. The battery pack identifier of claim 27 wherein said logic circuit monitors the said dwell time of said identification signal and identifies the battery pack type of said battery pack based on said dwell time.

30. A battery pack type identifier for distinguishing between a plurality of different battery pack types to identify the type of a battery pack, comprising:
   a) a battery pack including a battery identification circuit; said battery identification circuit generating a repeating identification signal at said battery pack having a frequency between a low value and a high value and a dwell time at said high value;
   b) a reference signal; and
   c) a logic circuit external to said battery pack; said logic circuit monitoring said identification signal and said reference signal and computing a relative ratio thereof; and
   d) wherein the battery pack type of said battery pack is identified by said logic circuit based on said ratio.

31. The battery pack identifier of claim 30 wherein said logic circuit further identifies said battery pack type by comparing said ratio to one or more predetermined values; each of said predetermined values being associated with a battery pack type.

32. The battery pack type identifier of claim 30 further including a filtering circuit between said battery identification circuit and said logic circuit; said filtering circuit averaging said identification signal.

33. The battery pack type identifier of claim 30 further including a battery recharging device in communication with said battery pack.

34. The battery pack type identifier of claim 30 wherein said battery identification circuit includes at least a diode, an inverter, a capacitor, and a plurality of resistors.

35. A battery pack type identifier for distinguishing between a plurality of different battery pack types to identify the type of a battery pack, comprising:
   a) a battery pack including:
      i) a battery identification circuit; said battery identification circuit generating an identification signal having a fixed frequency between a low value and a high value and a dwell time at said high value;
    ii) a first positive power terminal, a first ground terminal, and a first identification terminal;
b) a reference signal;
c) a recharging device including:
    i) a filtering circuit; said filtering circuit generating an average of said identification signal;
    ii) a microprocessor logic circuit for comparing said average identification signal to said reference signal and generating a ratio thereof;
    iii) a second positive power terminal, a second ground terminal, and a second identification terminal;
d) wherein said first positive power terminal is connected to said second positive power terminal, said first ground terminal is connected to said second ground terminal, said first identification terminal is connected to said second identification terminal;
e) wherein said identification signal is communicated from said battery pack to said recharging device via said first identification terminal; and
f) wherein said battery pack type is identified based on said ratio by comparing said ratio to one or more predetermined values; each of said predetermined values being associated with a battery pack type.

36. The battery pack type identifier of claim 35 wherein said recharging device is a wireless communications device.

37. The battery pack type identifier of claim 36 wherein said wireless communications device is a cellular telephone.

38. The battery pack type identifier of claim 35 wherein said recharging device is a stand alone battery pack recharger.

39. The battery pack type identifier of claim 35 wherein said battery identification circuit includes at least a diode, an inverter, a capacitor, and a plurality of resistors.

40. The battery pack type identifier of claim 35 wherein said filtering circuit includes at least a capacitor and a resistor.

41. The battery pack type identifier of claim 35 wherein said logic circuit is a microprocessor.

42. The battery pack type identifier of claim 35 wherein said battery pack further includes a battery pack logic circuit in communication with said battery identification circuit and wherein said battery pack logic circuit causes said battery pack identification circuit to cease generating said identification signal after predetermined interval of time.

* * * * *